US008569680B2

(12) United States Patent
Luke et al.

(10) Patent No.: US 8,569,680 B2
(45) Date of Patent: Oct. 29, 2013

(54) HYPERACUITY FROM PRE-BLURRED SAMPLING OF A MULTI-APERTURE VISUAL SENSOR

(75) Inventors: Geoffrey P. Luke, Austin, TX (US); Cameron H. G. Wright, Laramie, WY (US); Steven F. Barrett, Laramie, WY (US)

(73) Assignee: University of Wyoming, Laramie, WY (US)

( * ) Notice: Subject to any disclaimer, the term of this patent is extended or adjusted under 35 U.S.C. 154(b) by 353 days.

(21) Appl. No.: 12/975,139

(22) Filed: Dec. 21, 2010

(65) Prior Publication Data
US 2012/0001058 A1    Jan. 5, 2012

Related U.S. Application Data

(60) Provisional application No. 61/288,449, filed on Dec. 21, 2009.

(51) Int. Cl.
*G01B 11/14* (2006.01)

(52) U.S. Cl.
USPC .......................................... 250/221; 356/623

(58) Field of Classification Search
USPC .................... 250/208.1, 208.2, 221; 356/623; 702/142, 150, 151
See application file for complete search history.

(56) References Cited

PUBLICATIONS

Benson, J.B.; Luke, G.P.; Wright, C.; Barrett, S.F., "Pre-Blurred Spatial Sampling can Lead to Hyperacuity," Digital Signal Processing Workshop and 5th IEEE Signal Processing Education Workshop, 2009. DSP/SPE 2009. IEEE 13th , vol., no., pp. 570-575, Jan. 4-7, 2009.*
D. T. Riley, W. Harman, S. F. Barrett, and C. H. G. Wright, "Musca domestica inspired machine vision sensor with hyperacuity," IOP Journal of Bioinspiration & Biomimetics, vol. 3, No. 2, Jun. 2008.*
Geoffrey P. Luke et al., "A Multi-Aperture Bio-Inspired Sensor with Hyperacuity," pp. 1-7.
Geoffrey P. Luke et al., "Software Model of an Improved Bio-Inspired Sensor," ISA Biomedical Sciences Instrumentation 45, 179-184, 2009.
Geoffrey Luke, "Design and Testing of a Multi-Aperture Bio-Inspired Sensor," A thesis submitted to the Department of Electrical and Computer Engineering and the College of Engineering and Applied Science of The University of Wyoming in partial fulfillment of the requirements for the degree Master of Science in Electrical Engineering, 2009, pp. i-65.

* cited by examiner

*Primary Examiner* — Thanh Luu
*Assistant Examiner* — Renee Naphas
(74) *Attorney, Agent, or Firm* — Samuel M. Freund; Cochran Freund & Young LLC

(57) ABSTRACT

A multi-aperture passive light sensor and method for detecting motion and edges of an object are described. The sensor may include at least two focusing lenses mounted on a spherical surface for focusing light from the object into the ends of optical fibers, the optical axis for each lens diverging at an angle from that of adjacent lenses depending on the intended application. Each lens is located closer to the end of its associated optical fiber, which is disposed coaxially to the optical axis of the lens, than the natural focal plane of the lens, thereby blurring the light received from the object. Light exiting the fibers is detected by photosensors located at the opposite end of each optical fiber, and voltage differences between the voltages generated in response to the light intensity impinging on the photosensors are used to detect motion and edges of the object.

24 Claims, 18 Drawing Sheets

HYPERACUITY FROM PRE-BLURRED SAMPLING OF A MULTI-APERTURE VISUAL SENSOR

RELATED CASES

The present patent application claims the benefit of Provisional Patent Application Ser. No. 61/288,449 filed on 21 Dec. 2009 entitled "Multi-Aperture Visual Sensor With Hyperacuity" by Geoffrey P. Luke et al., the disclosure and teachings of which are hereby incorporated by reference herein.

STATEMENT REGARDING FEDERAL RIGHTS

This invention was made with government support under Grant No. P20 RR015553 and Grant No. P20 RR015640-06A1, awarded by the National Center for Research Resources to the University of Wyoming, and under Contract No. FA4819-07-C-0003 between the U.S. Department of Defense and the University of Wyoming. The government has certain rights in the invention.

FIELD OF THE INVENTION

The present invention relates generally to imaging systems and, more particularly, to imaging systems having increased ability to localize certain image features and/or to detect minute motions of such features.

BACKGROUND OF THE INVENTION

The majority of imaging systems are inspired by human vision, and generally include a charge-coupled device (CCD) or a complementary metal oxide semiconductor (CMOS) array behind a lens (or lenses) in a single-aperture "camera eye" design seen in the anatomy of the human eye. Such imaging sensors are intuitive and well-suited for many computer vision tasks. However, these sensors transfer a large quantity of information to a host processor. This is typically achieved using a serial connection, which limits the temporal resolution of the imaging device.

The fly (*Musca domestica*) eye appears at first blush to be a poorer imaging system since it possesses from small aperture optics which leads to a broad Gaussian (the actual response has the form of an Airy disk, but a Gaussian approximation is commonly used) photoreceptor response. This causes the fly to have poor resolution in the traditional sense, that is, the ability to resolve line pairs. The fly's spatial resolution (also known as the minimum angular resolution (MAR) is approximately $\frac{2}{5}°$, compared with the MAR of the human eye, which is $\frac{1}{60}°$ for 20/20 vision. While the Gaussian response is detrimental to the spatial resolution of the fly, it actually increases the fly's ability to detect motion. Insects have the ability to detect object motion over much smaller distances than the theoretical resolution limit of their photoreceptor spacing. This is known as hyperacuity.

SUMMARY OF THE INVENTION

Accordingly, it is an object of embodiments of the present invention to provide an imaging system having increased ability to localize certain image features and/or to detect minute motions of such features.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the passive sensor for detecting motion and edges of an object at a distance from a surface of the sensor having a chosen shape, hereof, includes in combination: at least two spaced-apart, focusing lenses for receiving light from the object and disposed on the surface of the sensor, each of the at least two lenses having an optical axis, wherein the optical axes of adjacent lenses of the at least two focusing lenses have a chosen angle therebetween; at least two optical fibers, the surface of a first end of each of the at least two optical fibers being disposed along the optical axis of one of the at least two lenses, each of the lenses focusing light onto the surfaces of the at least two optical fibers, wherein the surfaces of each of the at least two fibers are located closer to an associated lens than the focal plane of the lens, whereby the light from the object is blurred; at least two light-to-voltage converters, one of the at least two light-to-voltage converters in optical communication with a second end of each of the at least two optical fibers, wherein a voltage responsive to the light from the object is generated by each of the at least two light-to-voltage converters; and means for measuring voltage differences between adjacent light-to-voltage converters from which motion and edges of the object are detected.

In another aspect of the invention and in accordance with its objects an purposes, the passive sensor for detecting motion and edges of an object at a distance from a surface of the sensor having a chosen shape, hereof, includes in combination: at least two spaced-apart, focusing lenses for receiving light from the object and disposed on the surface, each of the at least two lenses having an optical axis, wherein the optical axes of adjacent lenses of the at least two focusing lenses have a chosen angle therebetween; at least two light-to-voltage converters having a light-sensitive surface, each light-sensitive surface being disposed along the optical axis of one of the at least two lenses, each of the lenses focusing light onto the light-sensitive surfaces of the at least two light-to-voltage converters, wherein the light-sensitive surfaces are located closer to an associated lens of the at least two lenses than the focal plane of the lens, whereby the light from the object is blurred, and wherein a voltage responsive to the light from the object is generated in each of the at least two light-to-voltage converters; and means for measuring voltage differences between adjacent light-to-voltage converters from which motion and edges of the object are detected.

In another aspect of the invention and in accordance with its objects an purposes, the method for detecting motion and edges of an object at a distance from a surface having a chosen shape, hereof, includes the steps of: receiving light from the object on at least two spaced-apart, focusing lenses disposed on the surface facing the object, each of the lenses having an optical axis, wherein the optical axes of adjacent lenses have a chosen angle therebetween; focusing light from the at least two lenses onto the surface of a first end of each of at least two optical fibers disposed along the optical axis thereof, each end surface being located closer to the lens associated therewith than the focal plane of the lens, whereby the light form the object is blurred; generating a voltage from light exiting a second end of each of the at least two optical fibers; and measuring differences in the voltage generated from adjacent optical fibers, from which motion and edges of the object are detected.

In yet another aspect of the invention and in accordance with its objects an purposes, the method for detecting motion and edges of an object at a distance from a surface having a chosen shape, hereof, comprises the steps of: receiving light from the object on at least two focusing lenses disposed on the surface facing the object, each of the lenses having an optical axis, wherein the optical axes of adjacent lenses have a chosen angle therebetween; focusing light from the lenses onto each of at least two light-sensitive surfaces disposed along the optical axis of the lens associated therewith such that the light-sensitive surface is located closer to the lens than the focal plane of the lens, whereby the light from the object is blurred; generating a voltage from the light focused on each the at least two light-sensitive surfaces; and measuring differences in voltage generated from adjacent light-sensitive surfaces, from which motion and edges of the object are detected.

Benefits and advantages of the present invention include, but are not limited to, providing a passive light sensor having a motion signal capable of resolving motion smaller than the spacing between the lenses (hyperacuity), which is approximately linear, has a spatial sampling frequency of 0.133 samples/degree, and has a pixel response that is equal and symmetrical.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 2A is a graph of the response for adjacent pixels in an unblurred system, while

FIG. 6A is a graph illustrating motion detection maximization, while

FIG. 7A is a graph showing responses of adjacent pixels for parallel optical axes (that is, when ϕ=0°) to a close object (bottom) and to a distant object (top), the overlap increasing as the object distance increases, while

DETAILED DESCRIPTION OF THE INVENTION

Figure 1:
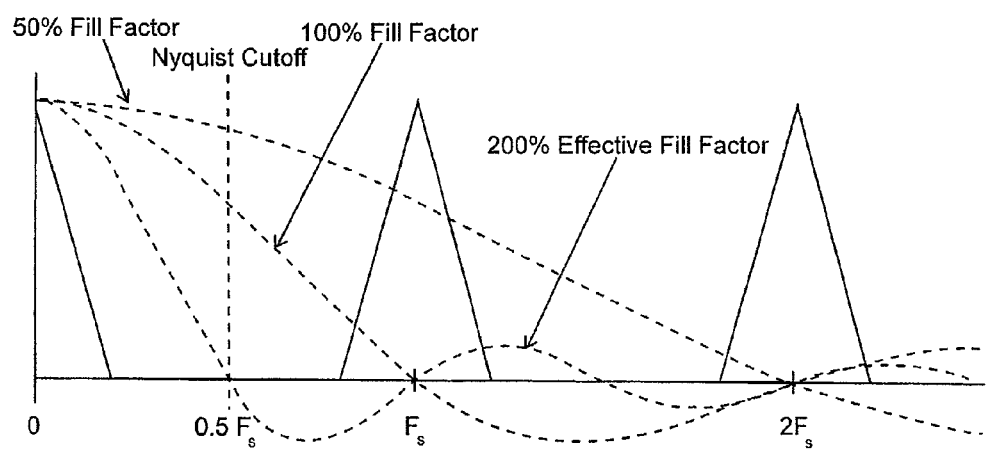
FIG. 1 shows the spectral weighting for 50%, 100%, and a theoretical 200% fill factor which are superimposed on the spectral copies of an ideally sampled image.

Briefly, the present invention includes a sensor and an associated vision system that provides high speed extraction of certain image features with low CPU overhead. The present sensor has advantages over traditional imaging sensors, which include: fast throughput of image data, hyperacuity (subpixel resolution), extraction and compression of image information such as edges or motion in real time, an ability to operate in a wide range of lighting and contrast situations, automatic contrast enhancement, and an effective six-fold photon capture improvement over traditional photometric sensors.

It is known that the fly eye has small aperture optics and "pixel" acceptance profiles that resemble a broad Gaussian shape with considerable overlap between pixels. Operation below the diffraction limit and use of the multi-aperture nature of the compound eye renders unimportant the effect of the optical aperture size of each corneal facet, and presents the apparent contradiction that the overlapping Gaussian response for the "pixels" responsible for spatial sampling in the present sensor, which is known to cause a pre-blurring of the incoming image source, actually generates certain high performance for specific optical capabilities and is largely responsible for the phenomenon of hyperacuity. The present sensor displays two closely related forms of hyperacuity: (a) static hyperacuity, in which the static location of an image feature can be resolved to subpixel precision; and (b) motion hyperacuity, in which small movements (a fraction of a pixel) of an image feature can be detected. These features do not generate better acuity in the traditional sense (that is, the ability to resolve line pairs).

An explanation of the non-uniform (Gaussian) overlapping photoelement response of the present sensor which generates both static and motion hyperacuity without a need for multiple image frames typically used to obtain subpixel resolution by other methods, will be provided hereinbelow, using signal processing terminology.

The term "resolution" is often used to describe a measure of the level of detail of a motionless object that can be detected by an imaging system. It is defined as the minimum angle that a line pair must be separated by in order to be detected with sufficient contrast. More specifically, this is called spatial resolution or static resolution. The spatial resolution is determined by two factors: the system's modulation transfer function (MTF) and the photodetector spacing.

In its most basic form, an imaging system consists of a lens and a light detection surface (that is, film or a CCD array), wherein the lens focuses the incoming light such that each point of light in the field of view is focused to a single point of light on the image plane. However, because of lens aberrations and finite aperture optics, the light that reaches the image plane cannot be condensed to a single point. Instead, it has some finite width (or blur) to it. Traditional imaging systems seek to minimize this blur so that it is not noticeable in the captured image.

The blur created by the optical system is defined by the point spread function (PSF). The PSF is the pattern observed on the image plane when a single point of light is presented to the system. It is commonly assumed that lens aberrations are negligible and the imaging system has a circular aperture. If so, the PSF takes on the form of an Airy disk. A Gaussian function is often used to approximate the main lobe of an Airy disk. The MTF of an optical system is obtained by taking the magnitude of the Fourier transform of the PSF. Since in theory such a point of light would need to be infinitesimally small, the exact PSF cannot be measured directly. In practice, there are a variety of ways to approximate the PSF and or the MTF of an optical system.

The width of the Airy disk limits the spatial resolution of the system. Rayleigh's criterion is a commonly used method for predicting the optical resolution limit. It states that $$x_{min} = 1.22 \frac{f\lambda}{D},$$

where f is the focal length of the system $\lambda$ is the wavelength of light, D is the aperture diameter, and $x_{min}$ is the resolution limit.

The resolution limit, $x_{min}$, can be estimated if the PSF or MTF are known. The parameter $x_{min}$ corresponds to the distance between the peak of the main lobe of the Airy disk and the first minimum. A smaller $x_{min}$ implies a higher static spatial resolution (that is, a line pair can be closer together and still be detected). An "ideal" imaging system assumes the PSF is an impulse function. Then, $x_{min}=0$ and the spatial resolution of the imaging system is not limited by the optics.

Similarly, the resolution limit can be estimated from the system's MTF. Let $$F_{cutoff} = \frac{1}{x_{min}}$$

be the highest spatial frequency that can be resolved. $F_{cutoff}$ may be defined to be the first zero of the MTF. However, the contrast limit of the sensor limits this value. Thus, $F_{cutoff}$ is the frequency at which the MTF drops below the contrast limit. In the ideal case, an impulse PSF corresponds to a constant MTF. In this case, the MTF does not drop below the contrast limit. Intuitively, a large $F_{cutoff}$ results in a large spatial resolution.

In an imaging system, the MTF depends on more than just the optics. The photosensitive area must be taken into account. Because each photodetector has nonzero surface area, light is gathered from the entire photosensitive area (that is, spatial integration occurs). This results in a tophat response if uniform sensitivity is assumed. The effects of the tophat response can be accounted for by convolution in the spatial domain or multiplication (with the appropriate sin c function) in the frequency domain. This convolution broadens the PSF and necessarily degrades the spatial resolution. Similarly, lens aberrations and other imperfections in the system can be accounted for by convolution with the appropriate function. This leads to the combined point spread function, h(x)=PSF·p(x)·q(x), where PSF is an Airy disk determined by the aperture size, p(x) is the sampling (or light acceptance) function (tophat in this case), and q(x) is a function that accounts for all non-ideal aspects of the imaging system. All of these non-ideal characteristics have the effect of broadening h(x) and decreasing the spatial resolution of the system.

The combined PSF, h(x), can be calculated in the spatial or frequency domain by using the PSF or MTF, respectively. Sampling function p(x), and the function q(x) cause the original PSF to broaden, while P(f) (the Fourier transform of p(x)) and Q(f) (the Fourier transform of q(x)) cause the original MTF to narrow.

Reference will now be made in detail to the present embodiments of the invention, examples of which are illustrated in the accompanying drawings. In the Figures, similar or identical structure will be identified using the same reference characters.

Rayleigh's criterion defines $x_{min}$ to be the distance from the peak of h(x) to its first minimum. Convolutions in the equation for h(x) increase the value of $x_{min}$. The second limiting factor on the spatial resolution is the photodetector spacing, $X_s$. The resolution is limited to the Nyquist frequency of $$F_x = \frac{1}{2X_S}.$$

Thus, the maximum spatial resolution of the imaging system is $$F_{max} = \min\left(\frac{1}{2X_S}, \frac{1}{x_{min}}\right).$$

The Nyquist limit, $$\frac{1}{2X_S} = \frac{F_S}{2},$$

specifies the spatial frequency beyond which aliasing occurs. Sampling results in copies of the spectrum of the image at $F_s$, $2F_s$, etc. These copies are depicted as triangles in FIG. 1. Aliased components from these copies can degrade image reconstruction.

Each pixel's photosensitive area (that is, the width p(x)) has the effect of scaling the spectral copies. If p(x) is assumed to be a tophat, then P(f) takes the form of a sin c function. FIG. 1 shows P(f) for the 50%, 100%, and a theoretical 200% case. P(f) acts as a low-pass filter and has the effect of attenuating the spectral copies of the image, higher fill factor cases producing more attenuation on the spectral copies. The photosensitive area does not decrease the spatial resolution of the system until the fill factor exceeds 200% (In practical applications, the cutoff is less than 200%; it is restricted by the contrast limit). A 200% fill factor, while impossible in a traditional imaging system, can effectively be achieved in a multi-aperture system or by using a microlens array and a CCD array. This corresponds to an effective pixel overlap of 50%.

The effects of pre-blurring on spatial resolution and motion acuity are now discussed. Pre-blurring refers to a broadening of the point spread function. This can be achieved in a variety of ways, but it is most easily accomplished by controlled de-focusing of the image.

As described hereinabove, pre-blurring may result in a reduction of spatial resolution. However, it is through this process that hyperacuity can be achieved. In order to evaluate the effects of pre-blurring, the response of adjacent pixels, c[0] and c[1], spaced $X_s$ apart, must be observed. Let the input image, f(x) be the impulse function, $\delta(x)$. The image is shifted by $\Delta x$. The changes in output due to this shift are referred to as $\Delta c[0]$ and $\Delta c[1]$. It follows that motion can be detected if $\Delta c[1]-\Delta c[0]>\epsilon$ where $\epsilon>0$ depends on the noise floor of the system. The detected motion is expressed as:

$$\Delta c[1]-\Delta c[0]=[h(X_s-\Delta x)-h(X_s)]-[h(-\Delta x)-h(0)].$$

Figure 2A:
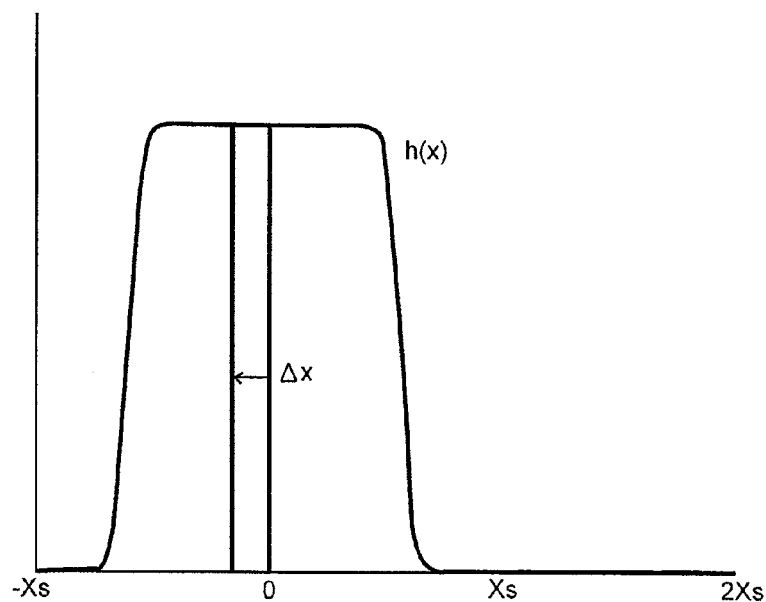

The case with minimal blurring is first considered. The width of the PSF is less than the width of p(x). Thus, the shape of h(x) will be dominated by p(x). This results in large constant areas for h(x) as may be seen in FIG. 2A. It is to be noted that the shift by a small $\Delta x$ results in negligible differences in pixel responses (that is, $\Delta c[0]=\Delta c[1]\approx 0$). In fact, $\Delta x$ must approach $X_s$ before any motion is detected. This is similar to human vision, where a shift of approximately $$\frac{X_S}{5}$$

must occur before motion is detected.

Figure 2B:
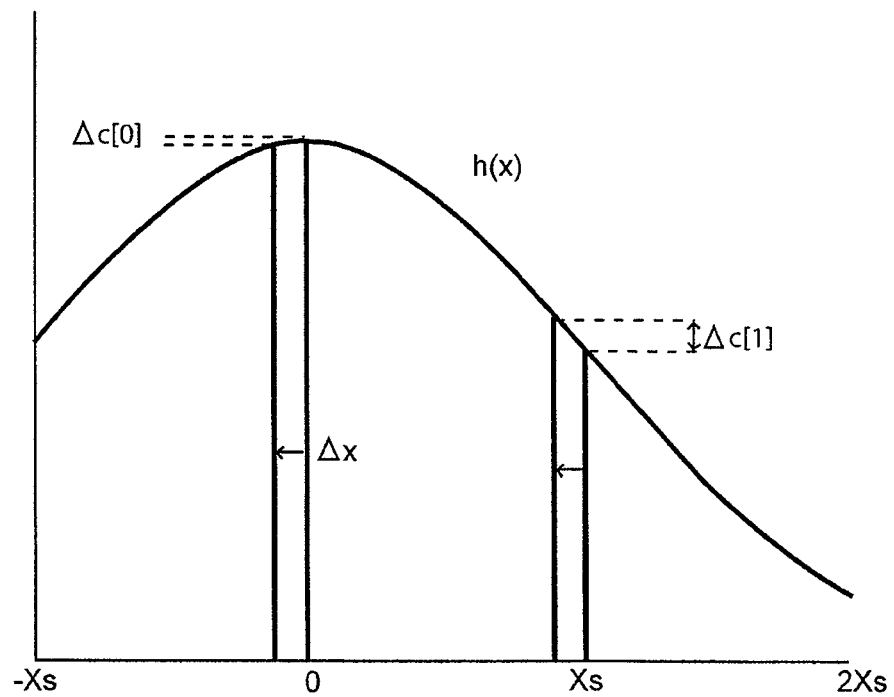
FIG. 2B is a graph of the response for adjacent pixel in a blurred system.

In the case with an appropriate amount of pre-blurring (FIG. 2B), the shape of h(x) is dominated by the PSF, and it appears to be Gaussian. Motion is more readily detectable in the pre-blurred case. Since there are no constant regions for h(x), any motion is theoretically detectable. However, in practical applications, the ability to detect motion is limited by the noise floor of the system, represented by $\epsilon$ above, and the contrast limit.

While pre-blurring can be used to achieve motion hyperacuity, excessive blurring leads to a more uniform PSF and little motion acuity. Therefore, $\Delta c[1]-\Delta c[0]$ can be maximized to optimize motion hyperacuity. It follows from the equation for this difference, hereinabove, that this is equivalent to maximizing:

$$\frac{d}{dx}h(x)\bigg|_{x=X_S}-\frac{d}{dx}h(x)\bigg|_{x=0}.$$

Since symmetry of h(x) is usually assumed, $$\frac{d}{dx}h(x)\bigg|_{x=0},$$

and hyperacuity is achieved when $$\frac{d}{dx}h(x)\bigg|_{x=X_x}$$

is maximized.

Additional details may be found in "Pre-blurred Spatial Sampling Can Lead to Hyperacuity" by John B. Benson et al., Proceedings of the 13th IEEE Digital Signal Processing Workshop (Marco Island, Fla.) pp. 570-575, January 2009, the disclosure and teachings of which are hereby incorporated by reference herein.

Software modeling was used to optimize hyperacuity and obtain predictions of hardware performance, including the present simple, scalable sensor. Optical modeling was performed using ZEMAX optical modeling software "Zemax: Software For Optical Design," ZEMAX Development Corporation, 2009, available online at http://www.zemax.com. ZEMAX is used for a wide array of optical design applications, including camera lens design and laser beam propagation modeling. ZEMAX uses ray tracing for its analysis of optical systems. However, more advanced tools such as physical and diffractive optics may be used. Sequential ray tracing and fiber efficiency tools of ZEMAX were employed. Sequential ray tracing permits a user to define a light source, and the program numerically traces a specified number of light rays through the optical system. Sequential refers to the fact that the light must impinge on the surfaces in a predefined order. The fiber efficiency ZEMAX tool calculates the percentage of rays emitted from the light source transmitted along the fiber. The numerical aperture (NA) of the fiber can be set to any desired number. In this model, NA values of 0.5 (the numerical aperture of the fiber that may be used in the hardware construction of the sensor) and 1.0 were used. The former corresponds to a 30° acceptance angle. In the latter case, all light that arrives at the fiber tip is transmitted. NA of 1.0 is used for modeling a photodetector. Matlab was also used in the software modeling ("Matlab And Simulink For Technical Computing," The MathWorks, Inc. 2009, available online at http://www.mathworks.com. The output data from ZEMAX were imported into Matlab to perform the numerical analyses associated with calculating hyperacuity, and to generate the following graphs.

Figure 3:
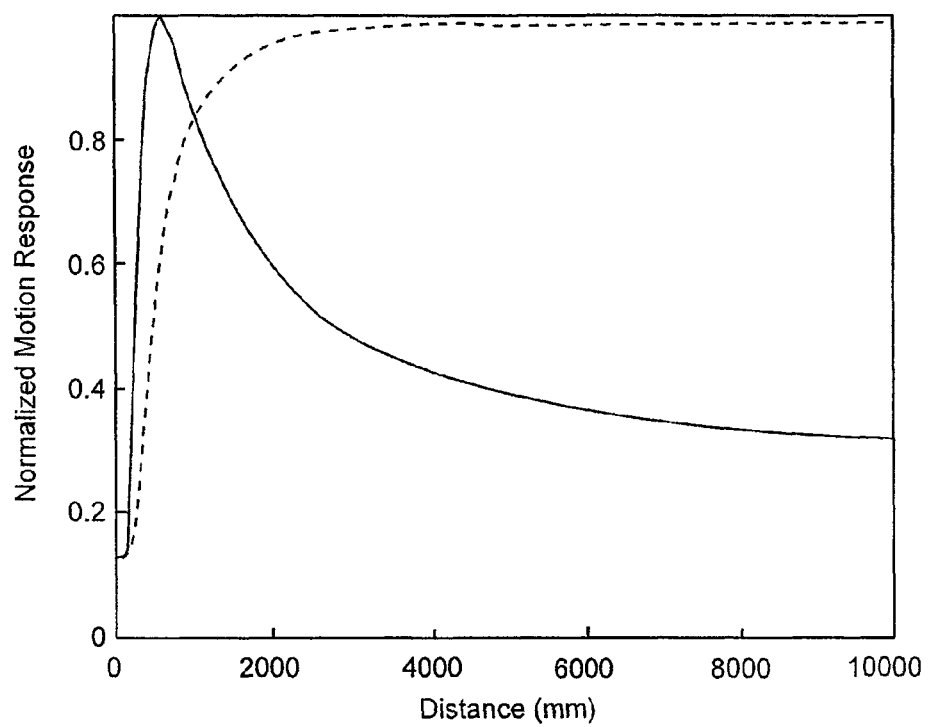
FIG. 3 is a graph of the motion response as a function of the object distance for parallel optical axes (solid) and divergent optical axes (dashed).

Each photoreceptor in an imaging system has an optical axis. This optical axis corresponds to the angle at which an object elicits a peak response from the receptor. The optical axes of the photoreceptors' can have a significant effect on their response overlap and the ability to detect motion. It is known that a fly eye has photoreceptors with (approximately) parallel optical axes (which causes response overlap to vary with distance) as well as photoreceptors with divergent optical axes (which generates a response overlap that is relatively constant over all distances). FIG. 3 shows how optical axis angle and distance affect the ability to detect motion. The solid line shows a simulation of photoreceptors with parallel optical axes and the response to motion thereof at a range of distances. It is observed that there is a strong peak at close distances that dies off quickly. The dashed line shows photoreceptors having divergent optical axes. The response is greater and more consistent for distant motion. It is possible for both optical axis designs to be combined in a single sensor (as exists for the fly). However, in order to simplify the design, only divergent optical axes are used in embodiments of the present sensor. This simplifies optimizing hyperacuity, produces hyperacuity over a large range of distances, and makes the present sensor resemble an apposition eye more than a neural superposition eye (although a large part of the difference between the two types of compound eyes comes from the manner in which the signals are processed in the neural layer rather than the optical front end).

Figure 4:
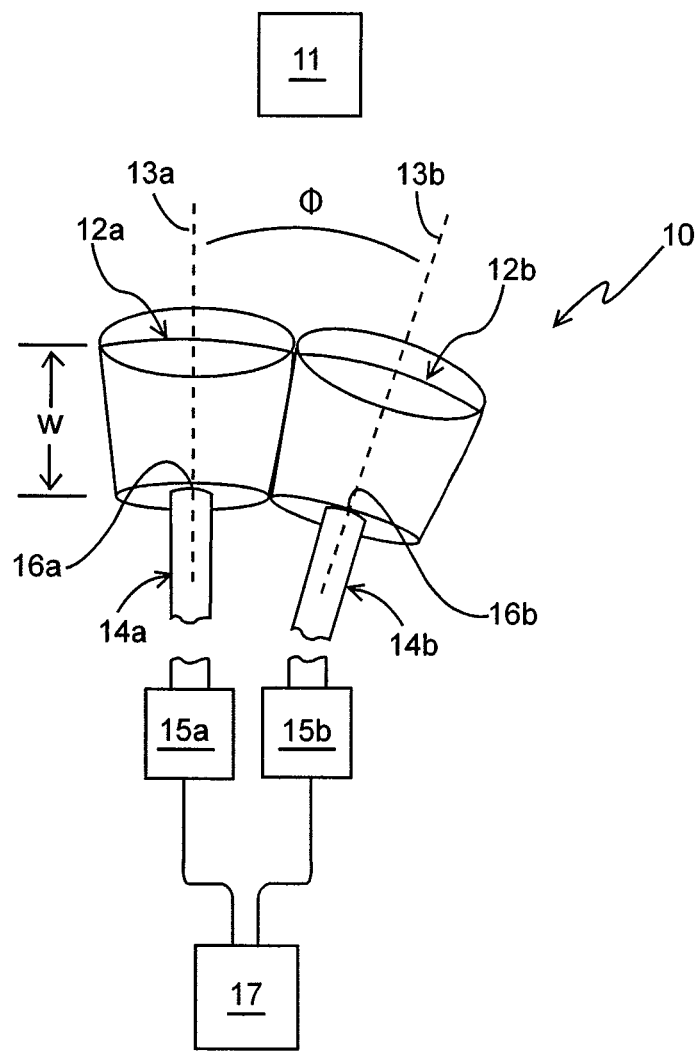
FIG. 4 shows a schematic representation of an embodiment of the sensor of the present invention.

Desired pre-blurring may be achieved with a single lens. Software modeling facilitated experimentation with pooling data from adjacent lenses, lead to the multi-aperture sensor of one embodiment of the present invention. FIG. 4 shows a schematic representation of an embodiment of sensor, 10, for detecting motion and edges of object, 11. Sensor 10 may be a non-planar, multi-aperture design. In one configuration, each 3 mm lens, 12a, and 12b, having optical axes, 13a, and 13b, respectively, focuses light from the object into a single, multi-modal optical fiber, 14a, and 14b, respectively, having a core diameter of 1 mm, a jacket diameter of 2.2 mm, and a numerical aperture of 0.5. Each fiber tip 16a, and 16b, has a surface for receiving light from corresponding or associated lens, 12a, or 12b, respectively, the surfaces being disposed along the optical axis at a distance, w, behind its corresponding lens 12. Inter-lens angle, ϕ, between the optical axes of adjacent lenses is also shown in the FIG. 4. It will be shown that hyperacuity can be optimized for this sensor configuration by simply adjusting the two parameters w and ϕ. Photodetectors or photosensors, 15a, and 15b, each having a light-sensitive area, receive light from the second end of fibers 14a, and 14b, respectively, whereby a voltage responsive to the light intensity is generated. Means, 17, for measuring the difference in the voltages generated by photodetectors 15a and 15b are provided. It should be mentioned that means 17 may be any of several well-known devices.

Photosensors may also be employed without the use of optical fibers between the photosensor and focusing lenses 12a and 12b.

Figure 5A:
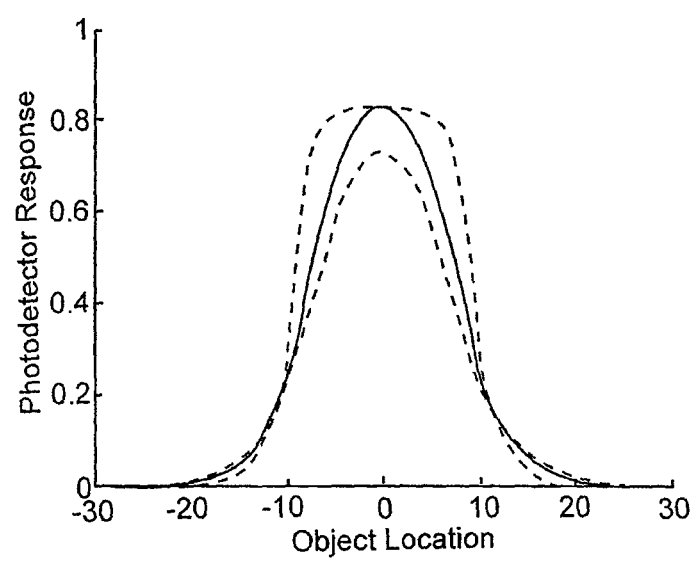
FIG. 5A is a graph of the response of the photodetector as a function of lens placement with respect to the distal tip of the fiber optic, illustrating the effect of blurring on an individual pixel response.

To maximize the motion acuity of the sensor, the response of a single photoreceptor was optimized. This was achieved by adjusting the distance w between the lens and the image plane. If w is chosen to be the focal length of lens 12, then the light is most focused. As w deviates from the focal length, the light on the fiber becomes increasingly blurred. The more response each photoreceptor has to light, the easier it is to detect motion. However, optimizing the response is more complex than maximizing the peak. A Gaussian shape must be maintained so that there are no "flat" regions in the response (motion cannot be detected in a region of constant response). Therefore, a heuristic method was used to determine optimal pre-blurring (wherein the response with the highest peak that still appeared as Gaussian was chosen as optimal). FIG. 5A illustrates three cases: insufficient pre-blurring (top dashed line), excessive pre-blurring (bottom dot-dashed line), and ideal pre-blurring (middle solid line). The optimization led to a value of w=2.4 mm with the components identified hereinabove. In the insufficient pre-blurring case, the gain in peak response is seen to be negligible. Here the light is focused onto a spot much smaller than the 1 mm fiber tip, 16, which results in a large area of relatively constant response. In the over-blurred case, the shape is approximately Gaussian, but the peak response is not optimized. This situation corresponds to a blur radius larger than the 1 mm fiber. The optimal response corresponds to a blur radius of 1 mm; therefore, at the peak response, the blurred light lies exactly on top of the fiber, and the pre-blurring does not necessarily decrease the peak response of a pixel to light, but rather has a negligible effect when applied correctly.

Figure 5B:
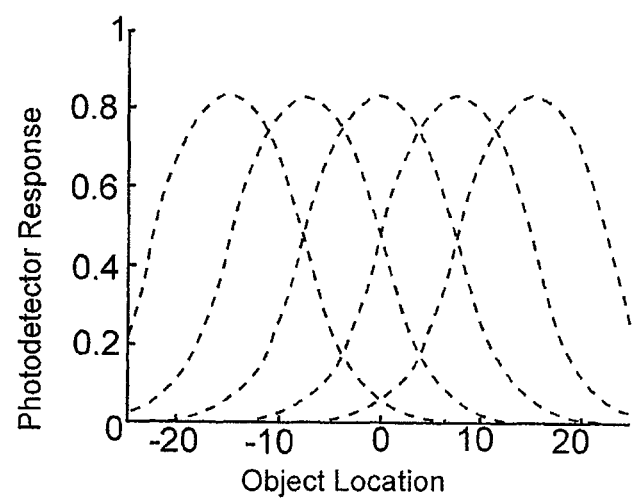
FIG. 5B shows five adjacent pixels having overlapping responses.
Figure 5C:
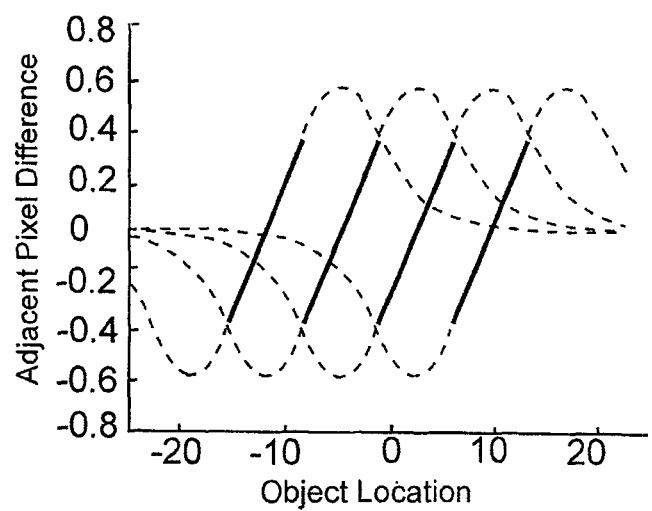
FIG. 5C shows the differences between adjacent pixels which allows motion detection with hyperacuity.

The second task in hyperacuity maximization is adjusting the amount of overlap between adjacent pixel responses. This was achieved by adjusting the inter-lens angle (ϕ). The amount of overlap that maximizes the ability to detect motion is first determined. The ability to detect motion is governed by the slope of the difference between adjacent responses. FIG. 5B shows five adjacent pixels having overlapping responses, and FIG. 5C shows the differences between adjacent pixels. The region of the signal that is relevant to motion detection is shown as a thicker solid line in FIG. 5C. Motion is most difficult to detect when an object is centered directly over a pixel. As shown in FIG. 5B, the slope at this point is 0. Therefore, neighboring pixels are used exclusively for motion detection. In order to maximize motion acuity, the response to motion was maximized for this situation.

Figure 6A:
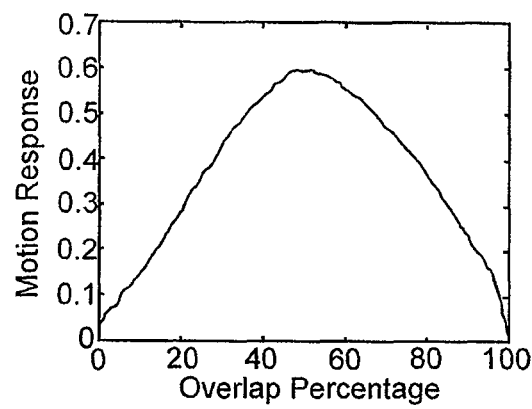
Figure 6B:
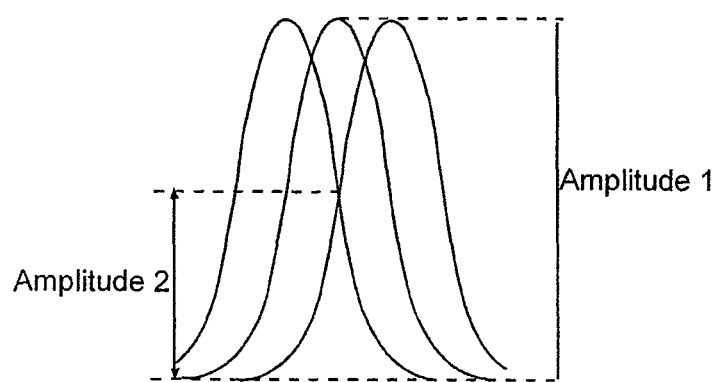
FIG. 6B is a graph defining the response overlap.
Figure 7A:
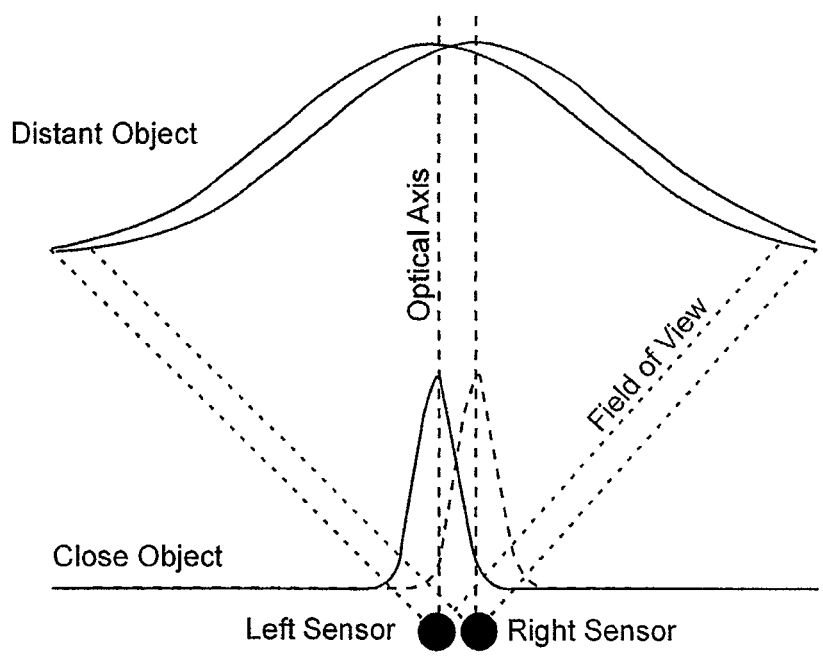

FIG. 6A shows the motion detection of a smoothed photodetector response as a function of the amount of overlap. The percentage of overlap is given by the formula:

$$\% \text{ Overlap} = 100 \cdot \frac{\text{Amplitude 1}}{\text{Amplitude 2}},$$

where Amplitude 1 and Amplitude 2 are defined in FIG. 6B. FIG. 6A shows that the motion response is maximized at approximately 50%. This corresponds to the steepest slope of the response (that is, the response is steepest at approximately half of its peak). The ideal overlap was used to find the optimal lens angle. Overlap is not constant for a given lens angle; it varies as a function of object distance. As an object gets further away from the lens, the overlap increases. Consider an inter-lens angle of ϕ=0°, as is shown in FIG. 7A. An object close to the lenses will result in very little overlap, but an object located at optical infinity will yield an overlap of 100%. Therefore, the choice of ϕ is application dependent.

Figure 7B:
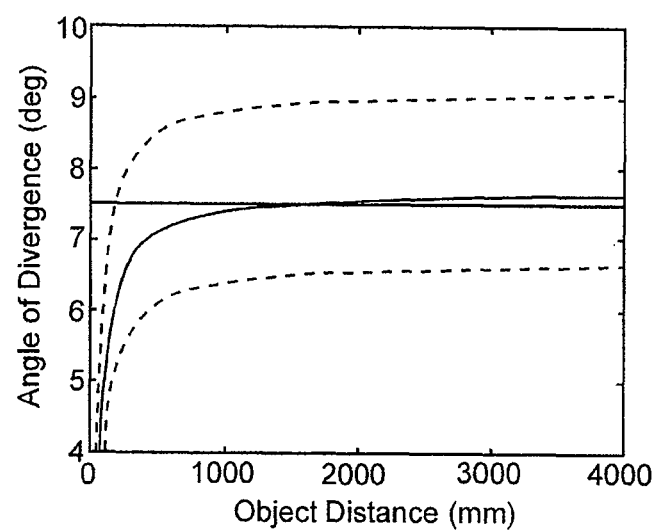
FIG. 7B is a graph showing the angle of divergence (that is, when ϕ>0°) as a function of object distance.

FIG. 7B shows the angle of divergence of the optical axes of the lenses as a function of object distance. The solid black line depicts the angle of divergence of the optical axes of the lenses that gives the ideal overlap. The dashed lines show the angle of divergence of the optical axes of the lenses that result in a motion response of 90% of the peak. It is apparent that there is a large range of ϕ that gives acceptable motion acuity. The ideal inter-lens angle approaches 7.8° as the object distance approaches infinity. However, in order to increase motion sensitivity at smaller object distances, a value of ϕ=7.5° was chosen. This is shown as the horizontal line in FIG. 7B. Using this value for the inter-lens angle maximizes motion detection with an object distance of approximately 1.4 m, which is the point of intersection shown in FIG. 7B. This choice will depend on the application, but ϕ=7.5° provides significant sensitivity to object motion at all distances. It is to be mentioned that values of ϕ between about 0° and about 20° are anticipated, depending upon the specific application for motion detection.

Benefits of the embodiment of the present invention described hereinabove include a motion signal that is approximately linear which means that the response to motion is the same, regardless of the object's location. The information in the sensor is efficiently collected, and although the present sensor has few photodetectors, the sensor exhibits a spatial sampling frequency of 0.133 samples/degree. Another benefit of the present sensor is that each pixel response is equal and symmetrical since the sensor is not sensitive to lens aberrations. Therefore, there is no asymmetric response which would need to be compensated for by signal conditioning electronics.

A spatial sampling frequency of 0.133 samples/degree provides poor resolution compared with traditional imaging systems. In order to improve the resolution for reasons other than motion detection, the angle between the optical axes of the lenses may be decreased. This can be accomplished without greatly decreasing the motion acuity of the sensor. In order preserve motion acuity as ϕ is decreased, each individual response may be made narrower, which can be achieved by reducing the amount of pre-blurring and decreasing the photosensitive area. In this manner, the Gaussian shape is preserved, and the overall response is not severely affected.

Figure 8:
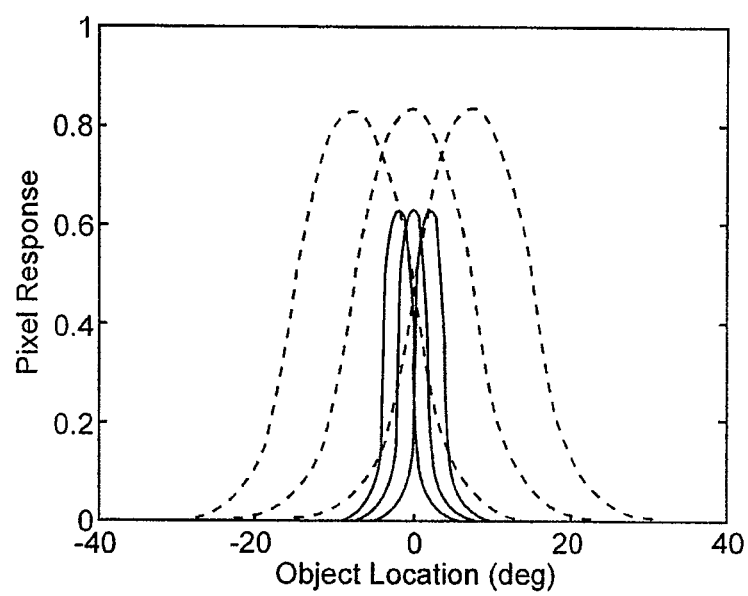
FIG. 8 is a graph showing a simulated sensor having increased spatial resolution.

FIG. 8 shows the simulated results using an optical model of a sensor with an improved spatial resolution. The dashed line shows the response of the sensor described hereinabove, while the solid line shows the response of a sensor that uses the same 3 mm lens, but uses a multi-mode optical fiber having a core diameter of 0.2 mm and a 2° inter-lens angle. The spatial resolution improved to 0.5 samples/degree with little loss of overall response to motion. This is closer to the spatial resolution observed in a fly (0.4 samples/degree). Use of microlens arrays and very-large-scale integration (VLSI) are expected to reduce the photosensitive area and to increase the spatial acuity, thereby eliminating the need for bulky photodiodes or numerous optical fibers.

Additional details may be found in "Software Model Of An Improved Bio-Inspired Sensor," by Geoffrey P. Luke et al., in ISA Biomedical Sciences Instrumentation 45, 179-184 (2009), the disclosure and teachings of which are hereby incorporated by reference herein.

Figure 9A:
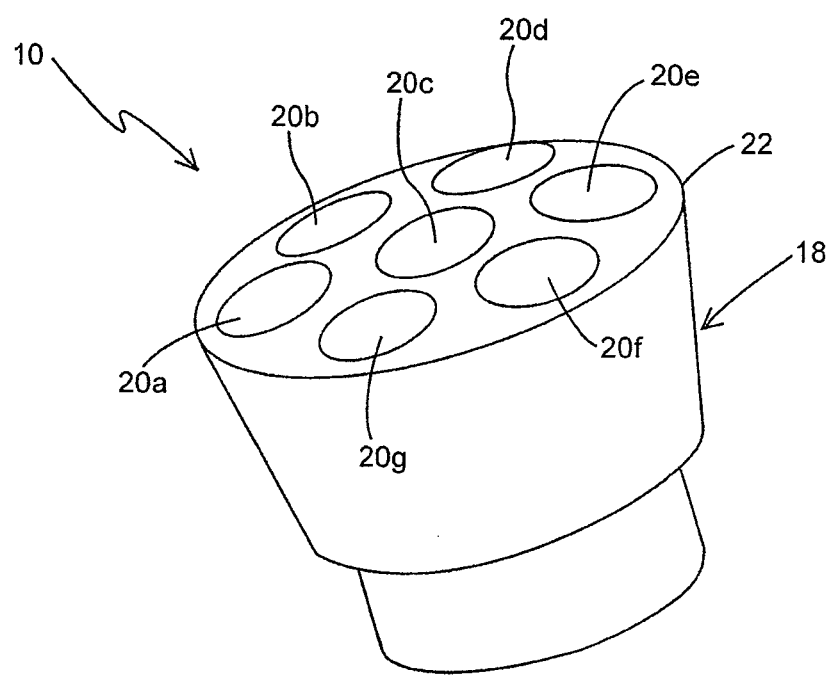
FIG. 9A is a schematic representation of an isometric view of a SolidWorks model of an embodiment of a lens housing of the present invention suitable for supporting multiple sensors in a hexagonal pattern.
Figure 9B:
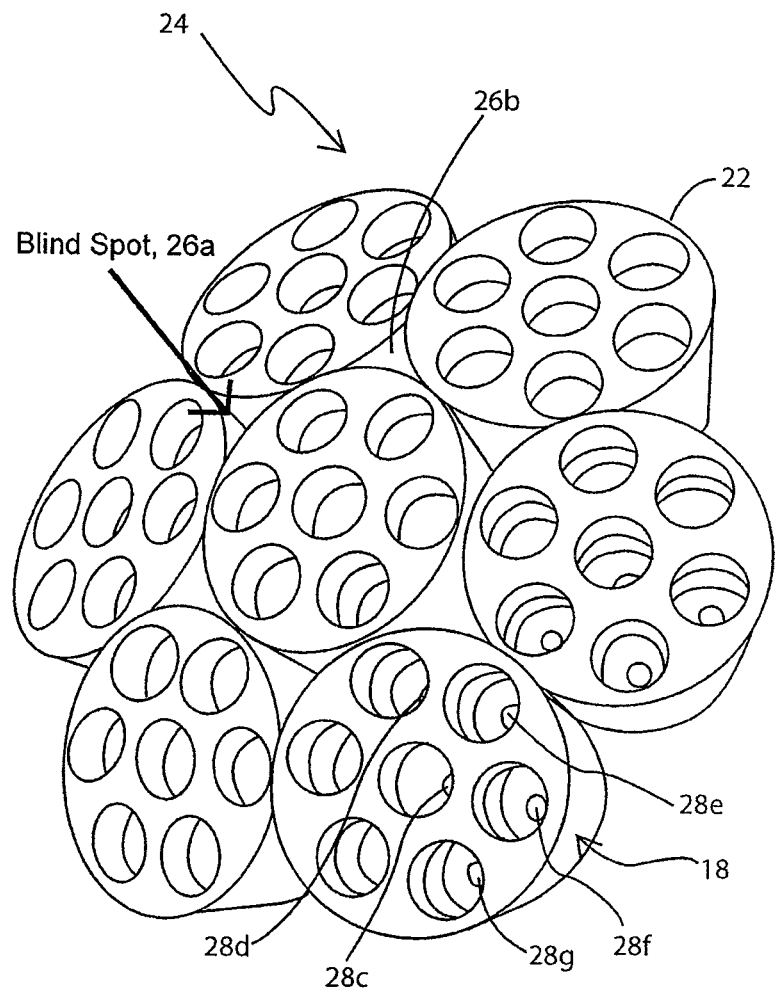
FIG. 9B is a schematic representation of an isometric view of a plurality of lens housings of the type shown in FIG. 9A arranged in a non-planar hexagonal pattern.

A lens housing capable of holding seven lenses in a hexagonal pattern was designed using SolidWorks 3D CAD Design Software, Dassault Systemes SolidWorks Corp. 2009, available online at http://www.solidworks.com, to precisely align the lenses and optical fibers; however, this design may be expanded to include a larger number of lenses. Referring again to FIG. 4, the inter-lens angle, $\phi=7.5°$, and the image plane location, w=2.4 mm were used to optimize the motion hyperacuity of the sensor. Lens housing, 18, illustrated in FIG. 9A, is shown having holes, 20a-20g, for holding seven lenses 12 (FIG. 4) and seven optical fibers, 14 (FIG. 4) and for maintaining consistent and accurate values of $\phi$ and w. Circular face, 22, of housing 18 provides a shape that easily tessellates a spherical surface. Hexagons tessellate on a planar surface, but overlap on non-planar surfaces. Multiple housings 18 can be arranged in a nonplanar hexagonal array, 24, to expand the field of view (FOV) of the sensor, as may be seen in FIG. 9B. Any number of sensor housings 18 may be combined to expand the FOV as desired. In the configuration shown, there are small gaps between the lenses, 26a, and 26b, as examples. A lens and fiber might occupy these "blind spots". FIG. 9B also illustrates holes, 28c-28f, in housing 18 through which optical fibers 14 may be passed in order to ensure that an optical fiber may be correctly placed (2.4 mm behind each lens).

Figure 10A:
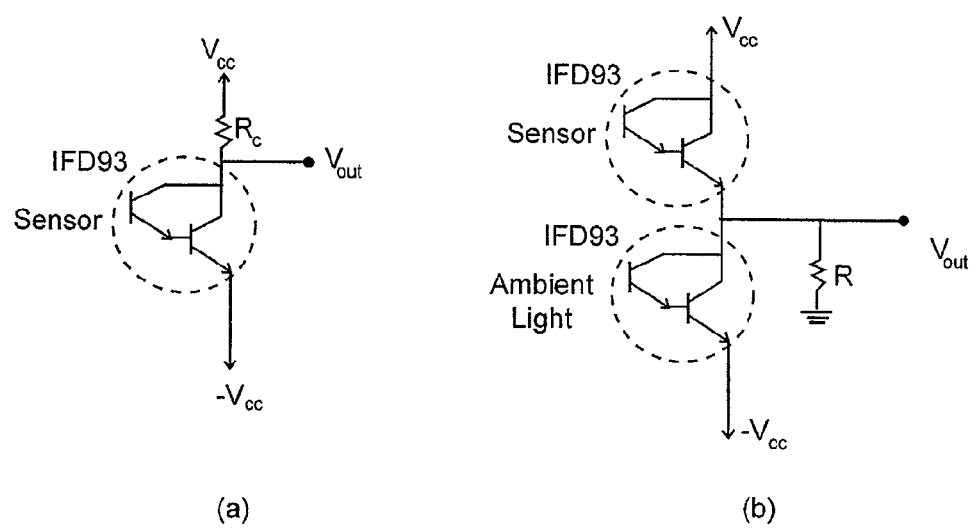
FIG. 10A illustrates the amplifier circuits using an IFD93 (a) without and (b) with ambient light adaptation.
Figure 10B:
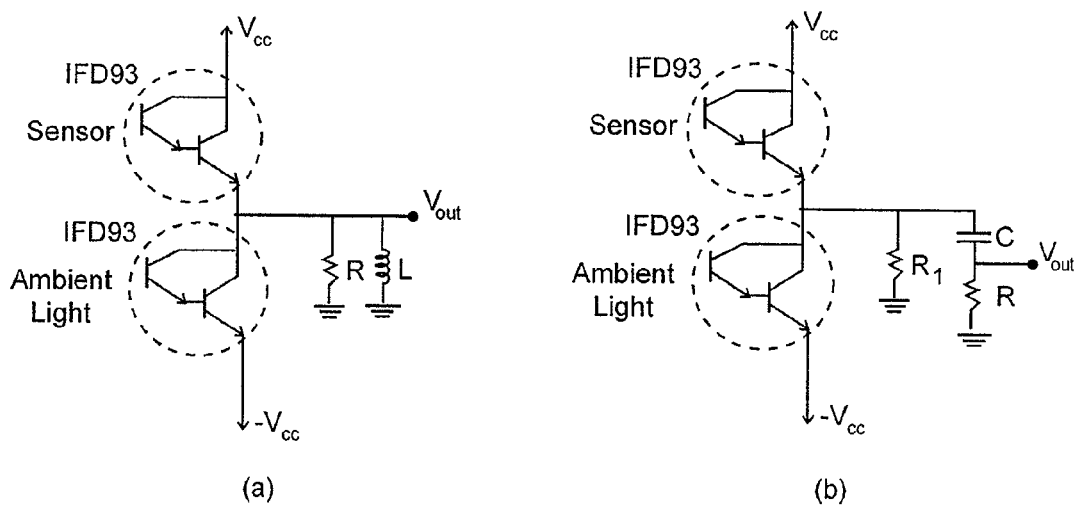
FIG. 10B illustrates amplifier circuits using an IFD93 with (a) RL and (b) RC high-pass filters.

An IFD93 photodarlington fiber optic receiver with a common emitter amplifier was used to sense light from the optical fibers. The electronic interface began as a simple common emitter amplifier shown (circuit (a)) in FIG. 10A. Here, $V_{out}=V_{cc}-I_{sensor} \times R_c$ where $I_{sensor}$ is the current flowing through the photodarlington and is proportional to the amount of light sensed. However, the transistor tended to saturate in bright conditions. Therefore, a simple form of light adaptation was added; a second IFD93. This photodarlington measured the average intensity of the ambient light in the room. The resulting circuit is shown in FIG. 10A as circuit (b). $V_{out}=(I_{sensor}-I_{ambient}) \times R$, where $I_{ambient}$ is the current flowing through the ambient light photodarlington. This configuration allows for a much wider range of ambient light. It is desirable that a change in ambient light equally affects $I_{sensor}$ and $I_{ambient}$. However, the sensor tended to collect more light than the IFD93 alone. Therefore, an increase in ambient light resulted in an increase in $V_{out}$, but the ambient light sensor reduced its effect by a factor of 5. In order to eliminate the remaining effects of ambient light, a high-pass filter was added. FIG. 10B shows two high-pass filter configurations, the object of these filters being to reduce $V_{out}$ to 0 unless there was a relatively rapid change in the sensor value (that is, motion was occurring). Circuit (a) in FIG. 10B proved to be impractical since all inductors have a nonzero resistance, $R_L$, and this resistance increases as the inductance increases. Assuming $I_{in}=I_{sensor}-I_{ambient}$, the transfer function is:

$$H(\omega) = \frac{V_{out}}{V_{in}} = \frac{1}{\frac{1}{R} + \frac{1}{j\omega L + R_L}} = \frac{j\omega LR + RR_L}{j\omega L + R + R_L}.$$

This leads to a zero at $$= \frac{R_L}{L},$$

and a pole at $$\omega = \frac{R + R_L}{L}.$$

The difficulty with this circuit is that L must be large or R must be small (which results in a small sensor gain) in order to detect a reasonable motion signal. In testing, no combination of R and L produced a measurable output. Circuit (b) in FIG. 10B was used as an alternative. It may be observed that if $\omega=0$, then $V_{out}=0$. Then, as $\omega \to \infty$, $V_{out} \to I_{in} \times (R\|R1)$. In practice, this circuit is effective for canceling out the effects of ambient light (that is, the output was reduced to 0 volts unless there was a moving object in the sensor's FOV), and only detecting changes in the sensor output (rather than the ambient light). However, the capacitor was found to cause an exponential decay that distorted the signal. This distortion may cause problems in both signal processing and motion recognition.

In view of the identified drawbacks for both analog high-pass filters described hereinabove, cancelling the ambient light may be achieved using software, or by use of an additional amplifying stage where the average pixel value is subtracted.

Having generally described the invention, the following EXAMPLE provides additional details thereof:

Example

Figure 11:
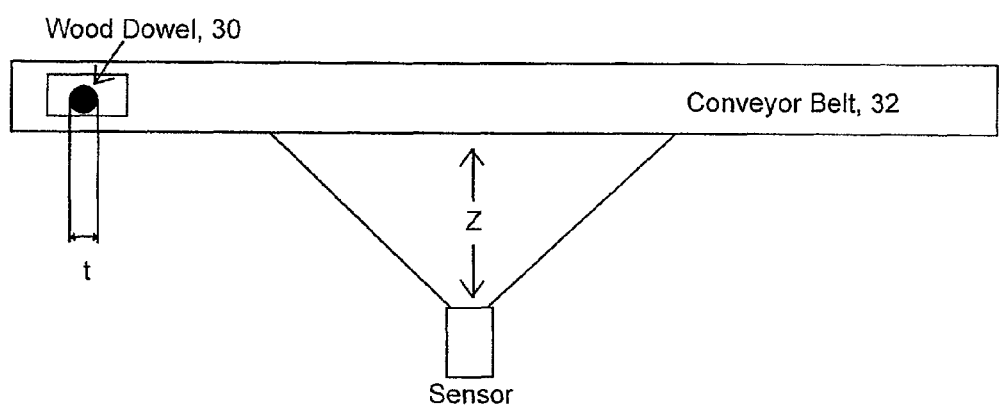
FIG. 11 shows a schematic representation of a top view of the apparatus used for testing an embodiment of the sensor of the present invention.

A test apparatus was constructed for comparing the present sensor's output to the software model. The test apparatus is schematically shown in FIG. 11, and included stationary sensor 10 placed a distance z from painted wood dowel, 30, disposed on conveyor belt, 32. White felt was placed behind the conveyor belt. Different dowels were used to provide stimuli having varying size and contrast. Each dowel rod was either painted white (for low contrast) or black (for high contrast) and had diameter t. The dowels were sufficiently long to span the vertical FOV of the sensor. The conveyor belt swept the dowel across the sensor's horizontal FOV at a constant velocity. The test apparatus was housed in a light-insulated room in order to provide consistent lighting conditions during each test. Overhead fluorescent lights illuminated the test apparatus to provide maximum contrast to the sensor. The fluorescent lights generated a flicker at 120 Hz, which is faster than the tested frequencies (under 10 Hz) and its effects were eliminated by the data acquisition circuits. The data was collected using a DATAQ DI-148U data acquisition system. Win-Daq/XL software ("Data Acquisition Products," DATAQ Instruments, Inc. 2009, available online at http://www.dataq.com) was used to record the data with a sample frequency of 240 Hz. While this sample frequency was sufficiently high to capture the fluorescent flicker, the flicker was not observed in the recorded data. This is most likely due to an anti-aliasing filter in the DI-148U.

Figure 12:
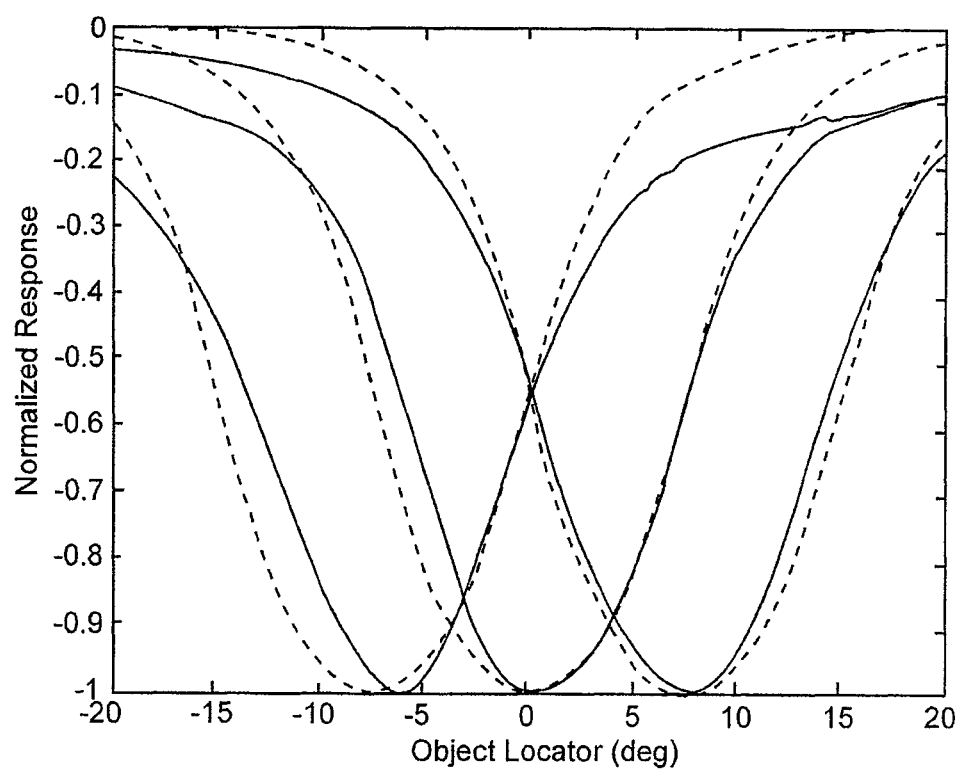
FIG. 12 is a graph of the normalized sensor response (solid lines) as a function of the location of the object and compares the normalized output from the sensor with the predicted output from the software model (dashed lines).

One of the goals testing the sensor was to validate the software model. If the software and hardware results correlate strongly, then a large portion of future sensor design and testing can be carried out in software, reducing development time and cost. FIG. 12 compares the normalized output from the sensor (shown as solid lines) with the predicted output from the software model (shown in dashed lines). The shapes of the sensor signals were approximately Gaussian and are close to the software model prediction. Any oddities and asymmetries may be attributed to flaws in sensor construction.

As stated hereinabove, the percentage of overlap between adjacent photoreceptor responses may be a significant factor in a sensor's ability to achieve motion hyperacuity. FIG. 12 shows that the overlap is approximately identical in both the hardware signals and the software model. In addition, the peaks of the hardware sensor response to the moving line stimulus match those of the software model. The exception is the signal on the left, which had a smaller amplitude than the other two. This may indicate that the difference is a result of an error in sensor construction. While there are differences between the software model and the hardware response, a strong correlation exists and validates the software model.

Figure 13A:
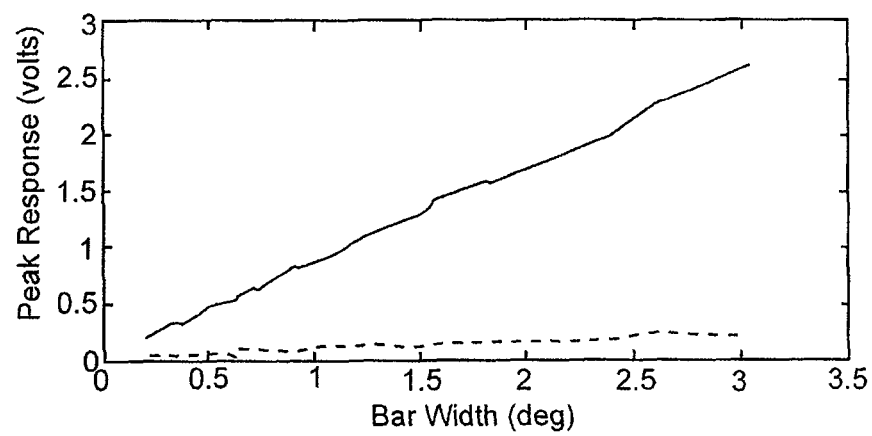
FIG. 13A is a graph showing the effect of the angular width of an object on the peak response of the sensor for high contrast (solid line) and low contrast (dashed line)
Figure 13B:
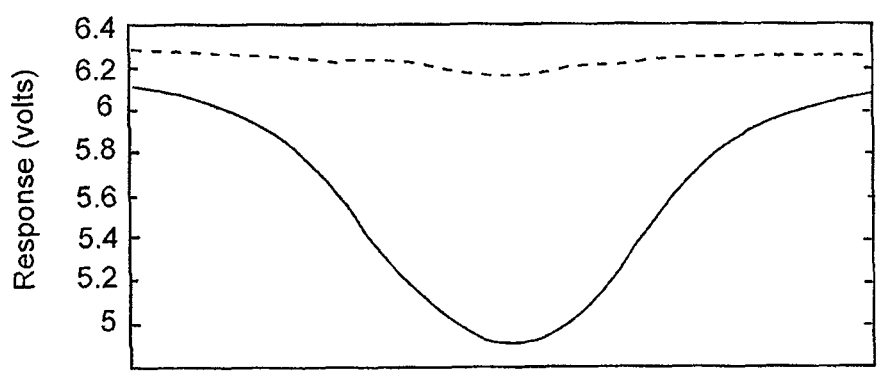
FIG. 13B is a graph showing the sensor response to a moving bar having a diameter of 1.5 cm with high contrast (solid line) and low contrast (dashed line), the x-axis representing the relative location of the object.

FIG. 13A is a graph illustrating the effect of the width of the bar on the response of the sensor. Two contrast situations are illustrated: high contrast is depicted with a solid line, while low contrast is shown with the dashed line. The sensor response increases approximately linearly as the angular width of the bar increases. The contrast between the object and the background determines the slope of the increased response. The high contrast case resulted in a slope of 1.2 volts/degree, whereas the low contrast case had a slope of 0.088 volts/degree. Thus, as the contrast of the object increases, motion becomes easier to detect. FIG. 13B shows the sensor response to the high contrast and low contrast case for a bar width of t=⅕ cm at a distance z=60 cm. The motion acuity of the sensor is limited not only by noise, but also by the contrast of the scene. If the contrast is sufficiently low that the peak sensor response does not exceed $V_{noise}$, then motion is no longer detectable.

Embodiments of the present sensor are expected to find use in a variety of sensing applications such as military and industrial imaging and computer vision tasks including mobile robot vision sensors, wheelchair guidance, high-speed inspection of railroad tracks, and long-term monitoring of stationary structures (buildings, bridges, and the like), as examples. Particular examples for military robotics applications may include unmanned aerial vehicle (UAV) obstacle avoidance, UAV automated landing, and intra-UAV optical communication.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A passive sensor for detecting motion and edges of an object at a distance from a surface of said sensor having a chosen shape, comprising in combination:
   at least two spaced-apart, focusing lenses for receiving light from said object and disposed on the surface of said sensor, each of said at least two lenses having an optical axis, wherein the optical axes of adjacent lenses of said at least two focusing lenses have a chosen angle therebetween;
   at least two optical fibers, the surface of a first end of each of said at least two optical fibers being disposed along the optical axis of one of said at least two lenses, each of said lenses focusing light onto the surfaces of said at least two optical fibers, wherein the surfaces of each of said at least two fibers are located closer to an associated lens than the focal plane of said lens, whereby the light from said object is blurred;
   at least two light-to-voltage converters, one of said at least two light-to-voltage converters in optical communication with a second end of each of said at least two optical fibers, wherein a voltage responsive to the light from said object is generated by each of said at least two light-to-voltage converters; and
   means for measuring voltage differences between adjacent light-to-voltage converters from which motion and edges of said object are detected.

2. The sensor of claim 1, wherein the chosen shape of the sensor surface is spherical.

3. The sensor of claim 1, wherein the amount of blurring of light from said object is chosen such that the light from one of said at least two lenses approximately fills the surface of the first end of the corresponding optical fiber of said at least two optical fibers when said object is located along the optical axis of that lens, and there are no regions of constant light intensity across the surface of the first end of said corresponding optical fiber.

4. The sensor of claim 3, wherein the light filling the surface of each of said at least two optical fibers has a Gaussian-shape intensity distribution.

5. The sensor of claim 1, wherein the angle between adjacent optical axes is chosen to maximize acuity for detection of motion and edges of said object.

6. The sensor of claim 5, wherein the chosen angle is less than 20°.

7. A passive sensor for detecting motion and edges of an object at a distance from a surface of said sensor having a chosen shape, comprising in combination:
   at least two spaced-apart, focusing lenses for receiving light from said object and disposed on the surface, each of said at least two lenses having an optical axis, wherein the optical axes of adjacent lenses of said at least two focusing lenses have a chosen angle therebetween;
   at least two light-to-voltage converters having a light-sensitive surface, each light-sensitive surface being disposed along the optical axis of one of said at least two lenses, each of said lenses focusing light onto the light-sensitive surfaces of said at least two light-to-voltage converters, wherein the light-sensitive surfaces are located closer to an associated lens of said at least two lenses than the focal plane of said lens, whereby the light from said object is blurred, and wherein a voltage responsive to the light from said object is generated in each of said at least two light-to-voltage converters; and
   means for measuring voltage differences between adjacent light-to-voltage converters from which motion and edges of said object are detected.

8. The sensor of claim 7, wherein the chosen shape of the surface of said sensor is spherical.

9. The sensor of claim 8, wherein the chosen angle is less than 20°.

10. The sensor of claim 7, wherein the amount of blurring of light from said object is chosen such that the light from one of said at least two lenses approximately fills the light-sensitive surface of the corresponding converter of said at least two converters when said object is located along the optical axis of that lens, and there are no regions of constant light intensity across the light-sensitive surface of said corresponding converter.

11. The sensor of claim 10, wherein the light filling the light-sensitive surface of said at least two converters has a Gaussian-shaped intensity distribution.

12. The sensor of claim 7, wherein the angle between adjacent optical axes is chosen to maximize acuity for detection of motion and edges of said object.

13. A method for detecting motion and edges of an object at a distance from a surface having a chosen shape, comprising the steps of:
 receiving light from the object on at least two spaced-apart, focusing lenses disposed on the surface facing the object, each of the lenses having an optical axis, wherein the optical axes of adjacent lenses have a chosen angle therebetween;
 focusing light from the at least two lenses onto the surface of a first end of each of at least two optical fibers disposed along the optical axis thereof, each end surface being located closer to the lens associated therewith than the focal plane of the lens, whereby the light form the object is blurred;
 generating a voltage from light exiting a second end of each of the at least two optical fibers; and
 measuring differences in the voltage generated from adjacent optical fibers, from which motion and edges of the object are detected.

14. The method of claim 13, wherein the chosen shape of the surface facing the object is spherical.

15. The method of claim 13, wherein the amount of blurring of light from the object is chosen such that the light from one of the at least two lenses approximately fills the surface of the first end of the corresponding optical fiber of the at least two optical fibers when the object is located along the optical axis of that lens, and there are no regions of constant light intensity across the surface of the first end of the corresponding optical fiber.

16. The method of claim 15, wherein the light filling the surface of the at least two optical fibers has a Gaussian-shaped intensity distribution.

17. The method of claim 13, wherein the angle between adjacent optical axes is chosen to maximize acuity for detection of motion and edges of the object.

18. The method of claim 17, wherein the chosen angle is less than 20°.

19. A method for detecting motion and edges of an object at a distance from a surface having a chosen shape, comprising the steps of:
 receiving light from the object on at least two focusing lenses disposed on the surface facing the object, each of the lenses having an optical axis, wherein the optical axes of adjacent lenses have a chosen angle therebetween;
 focusing light from the lenses onto each of at least two light-sensitive surfaces disposed along the optical axis of the lens associated therewith such that the light-sensitive surface is located closer to the lens than the focal plane of the lens, whereby the light from the object is blurred;
 generating a voltage from the light focused on each the at least two light-sensitive surfaces; and
 measuring differences in voltage generated from adjacent light-sensitive surfaces, from which motion and edges of the object are detected.

20. The method of claim 19, wherein the chosen shape of the surface facing the object is spherical.

21. The method of claim 19, wherein the amount of blurring of light from the object is chosen such that the light from each of the at least two lenses approximately fills the surface of the corresponding light-sensitive surface when the object is located along the optical axis of the lens, and there are no regions of constant light intensity across the surface of the corresponding light-sensitive surface.

22. The method of claim 21, wherein the light filling the surface of the at least two light-sensitive surfaces has a Gaussian-shaped intensity distribution.

23. The method of claim 19, wherein the angle between adjacent optical axes is chosen to maximize acuity for detection of motion and edges of the object.

24. The method of claim 23, wherein the chosen angle is less than 20°.

* * * * *